United States Patent
Sundström et al.

(10) Patent No.: US 9,148,234 B2
(45) Date of Patent: Sep. 29, 2015

(54) TECHNIQUE AND TEST SIGNAL FOR DETERMINING SIGNAL PATH PROPERITES

(75) Inventors: Lars Sundström, Södra Sandby (SE); Jim Svensson, Lund (SE); Leif Wilhelmsson, Dalby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 126 days.

(21) Appl. No.: 13/811,674

(22) PCT Filed: Jun. 17, 2011

(86) PCT No.: PCT/EP2011/060093
§ 371 (c)(1),
(2), (4) Date: Feb. 8, 2013

(87) PCT Pub. No.: WO2012/013421
PCT Pub. Date: Feb. 2, 2012

(65) Prior Publication Data
US 2014/0148112 A1    May 29, 2014

Related U.S. Application Data

(60) Provisional application No. 61/374,049, filed on Aug. 16, 2010.

(30) Foreign Application Priority Data

Jul. 28, 2010 (EP) .................................. 10007861

(51) Int. Cl.
*H04B 17/00* (2015.01)
*H04B 3/46* (2015.01)
(Continued)

(52) U.S. Cl.
CPC .............. *H04B 17/0042* (2013.01); *H04B 3/46* (2013.01); *H04B 17/21* (2015.01); *H04B 17/309* (2015.01);
(Continued)

(58) Field of Classification Search
USPC ................ 455/422.1, 423, 424, 67.11, 67.14, 455/226.1, 296, 305, 324, 337; 375/224, 375/226, 229
See application file for complete search history.

(56) References Cited

U.S. PATENT DOCUMENTS 3,510,585 A * 5/1970 Stone .......................... 375/224
6,670,900 B1 12/2003 Zhang
(Continued)

FOREIGN PATENT DOCUMENTS

WO        0079708 A1    12/2000

OTHER PUBLICATIONS

Green, R. A. "An Optimized Multi-Tone Calibration Signal for Quadrature Receiver Communication Systems." Proceedings of the Tenth IEEE Workshop on Statistical Signal and Array Processing, Aug. 14-16, 2000, pp. 664-667, Pocono Manor, USA.

(Continued)

*Primary Examiner* — Thanh Le
(74) *Attorney, Agent, or Firm* — Murphy, Bilak & Homiller, PLLC

(57) ABSTRACT

A test signal for determining a frequency-dependent or any other property of a receiver path is proposed. The test signal comprises, in a time domain representation, a sequence of discrete states that may be periodically repeated and that gives rise to a plurality of discrete tones in a frequency domain representation of the test signal. The test signal can be utilized for determining a frequency-dependent imbalance (e.g., an IQ imbalance) between different signal branches of a receiver or transmitter.

17 Claims, 9 Drawing Sheets

(51) Int. Cl.
  *H04L 1/24* (2006.01)
  *H04L 27/38* (2006.01)
  *H04B 17/21* (2015.01)
  *H04B 17/309* (2015.01)
  *H04L 27/26* (2006.01)
  *H04B 17/10* (2015.01)
  *H04B 17/20* (2015.01)

(52) U.S. Cl.
  CPC ............ *H04L 1/244* (2013.01); *H04L 27/3863* (2013.01); *H04B 17/10* (2015.01); *H04B 17/20* (2015.01); *H04L 27/2647* (2013.01)

(56) References Cited

U.S. PATENT DOCUMENTS

| | | | |
|---|---|---|---|
| 6,813,477 B1 * | 11/2004 | Harris et al. | 455/67.14 |
| 2005/0260949 A1 | 11/2005 | Kiss et al. | |
| 2007/0099570 A1 | 5/2007 | Gao et al. | |

OTHER PUBLICATIONS

Yanagisawa, K. et al. "A New DC-Offset and I/Q-Mismatch Compensation Technique for a CMOS Direct-Conversion WLAN Transmitter." IEEE/MTT-S International Microwave Symposium, Jun. 3-8, 2007, pp. 85-88, Honolulu, Hawaii, USA.

* cited by examiner

TECHNIQUE AND TEST SIGNAL FOR DETERMINING SIGNAL PATH PROPERITES

TECHNICAL FIELD

The present disclosure generally concerns the evaluation of frequency-dependent and other properties of a signal path comprising one or more signal branches. In particular a technique and a test signal for determining a frequency-dependent imbalance between different signal branches is described.

BACKGROUND

A receiver input signal, such as a Radio Frequency (RF) signal, has to be frequency-shifted ("down-converted") to be centred around Direct Current (DC), or zero frequency, before the signal content can be retrieved. For down-conversion, the RF signal is conventionally shifted to an Intermediate Frequency (IF) for initial signal processing before it is further shifted to DC. Modern receivers are often implemented as direct conversion receivers that avoid the first signal shift to IF. For this reason such receivers are also called zero-IF receivers.

While zero-IF receivers are advantageous as regards power, cost and size considerations, their characteristics are partially inferior to IF-based receivers. It has, for example, been observed that zero-IF receivers often suffer from an imbalance between different signal branches. The imbalance can be attributed to gain and phase errors introduced by components provided separately in or for the different signal branches such as mixers and oscillators. As an example of a signal branch imbalance, the imbalance between In-phase (I) and Quadrature (Q)-phase signal branches can be mentioned. This imbalance is also referred to as IQ imbalance.

The signal branch imbalance may have a frequency-independent or a frequency-dependent (i.e., frequency-selective) characteristic. Frequency-dependent imbalances have become an important factor to consider and mitigate as transmission bandwidth and modulation order are increasing.

US 2005/0260949 A discloses a technique for compensating a frequency-dependent IQ imbalance introduced by different characteristics of filters individually provided in the I and Q signal branches of a receiver. To this end, a test signal is applied to the filter inputs. The test signal is composed of two tones (i.e., two superimposed frequencies). The first tone is positioned near the centre of a filter pass-band, while the second tone is positioned near the edge of the pass-band. The filtered test signals are converted to the frequency domain, and gain and phase errors indicative of the IQ imbalance are determined next from the resulting frequency domain representations. In a final step, the IQ imbalance is compensated for based on the gain and phase errors thus determined.

As an alternative to a test signal composed of two tones, US 2005/0260949 A also teaches the utilization of one-tone test signals. Specifically, the first tone may be injected into the I and Q signal branches during a first time interval and the second tone may be injected during a subsequent second time interval. Still further, US 2005/0260949 A mentions that testing may also be performed over a large number of tones to determine an error matrix.

SUMMARY

There is a need for a test signal that can easily be generated and at the same time enables a reliable assessment of frequency-dependent parameters such as a frequency-dependent signal branch imbalance. There also is a need for a technique for determining a frequency-dependent signal branch imbalance based on such a test signal.

According to a first aspect, a method of determining a frequency-dependent imbalance between different signal branches is proposed. The method comprises the steps of providing at least one test signal, wherein the test signal in a time domain representation comprises a sequence of discrete states that gives rise to a plurality of discrete tones in a frequency domain representation of the test signal, subjecting the test signal to one or more time domain signal processing operations in each signal branch to obtain a processed test signal from each signal branch, converting the processed test signals from the signal branches, or an error signal derived therefrom, to the frequency domain to obtain a respective frequency domain representation, and determining the frequency-dependent imbalance from the one or more frequency domain representations.

The test signal may comprise two, three or more discrete states (i.e., discrete signal levels). Accordingly, in the case of two signal states the test signal will comprise a binary sequence, in the case of three signal states the test signal will comprise a ternary sequence, and so on. The sequence may have a sequence length of a few tens to the thousands depending on the ratio between the bandwidth of interest to the sample clock frequency of a sequence generator as well as a desired resolution in frequency. In one implementation, the sequence length equals $2^n$, with n typically ranging between 4 and 15. Moreover, the sequence may periodically be repeated in the test signal (e.g., within the duration of a frequency domain conversion frame).

The conversion to the frequency domain may be performed such that each signal to be converted is mapped to a number of predefined frequency points. The number of predefined frequency points may be defined by a frame length of the frequency domain conversion. If the frequency domain conversion is performed using Fast Fourier Transform (FFT) techniques, the number of predefined frequency points will thus be defined by the length of an FFT frame.

The sequence of discrete states may have a sequence length that is selected such that an integer multiple of the sequence length equals the frame length. In one implementation, the sequence of discrete states comprised in the test signal has a length that is a power-of-two fraction of the frame length.

The tones in the frequency domain representation of the test signal may be aligned with (i.e., may coincide with) the frequency points underlying the frequency domain conversion. The number of tones may be lower than the number of frequency points. In implementations in which the frequency-dependent imbalance is determined on a frequency point basis, interpolation techniques may be used to determine the frequency-dependent imbalance, or any other parameter, for frequency points located between two neighbouring tones.

The discrete tones may be selected such that they span at least a substantial portion of the nominal (e.g., maximum) or actual (e.g., presently utilized) signal bandwidth. The tones may, however, also cover a much broader bandwidth due to the specific nature of the test signal. In general, the discrete tones should span a frequency range wide enough to enable the determination (e.g., measurement or estimation) of frequency-dependent parameters over a particular frequency range of interest.

The sequence of discrete states in the test signal may dynamically be changed. As an example, the change may occur from one frame to the next frame of the frequency domain conversion process. The change may be performed in an (at least essentially) randomized manner.

The injection of the test signal in the signal branches may be synchronized with the frequency domain conversion of the test signals processed in the signal branches. In other words, a test signal generator and a frequency domain converter may be run synchronously to enable an accurate detection of the discrete spectral components (i.e., tones) included in the processed test signal. The synchronization may thus facilitate the mapping of the processed test signal to the predefined frequency points underlying the frequency domain conversion.

The sequence of discrete states comprised in the test signal may be selected such that a desired power distribution among the discrete tones in the processed and frequency-converted signal is obtained. As an example, the sequence could be designed such that the tones in one or more individual frequency regions have a larger magnitude (e.g., to provide a higher accuracy for such regions when determining the parameter(s) of interest from the resulting frequency domain representations).

The test signal may be generated using different generator types. In one implementation, a register-based generator type is used, such as a generator based on a Linear Feedback Shift Register (LFSR). The LFSR may be a Maximum Length (ML) LFSR which cycles through all the possible states (except the all zero state) of the shift register.

Different test signals may be provided for different signal branches. The test signals provided for different signal branches may differ regarding the respective sequence of discrete states. Alternatively, the different test signals may comprise a first test signal and a second test signal that is a delayed version of the first test signal.

For the purpose of determining a frequency-dependent imbalance, two, three or more signal branches may be provided. For the determination of other parameters, the test signal could also be injected in only a single signal branch. In a multi-branch scenario, a first signal branch may be provided for processing an in-phase signal component and a second signal branch may be provided for processing a quadrature phase signal component. In such a scenario the different test signals may be chosen (e.g., designed) such that a non-symmetric spectrum around zero frequency is obtained for the in-phase and quadrature phase signal components corresponding to the different test signals.

The technique presented herein may be performed concurrently with signal reception or transmission in a regular reception or transmission mode of a receiver or transmitter. This means that the test signals may be injected into the signal branches concurrently with the processing of a regularly received signal or of a signal to be regularly transmitted. In such a scenario, a power level of a received signal or a signal to be transmitted may be determined and a power level of the test signal may be controlled dependent on the power level thus determined. As an example, the power level of the test signal may be kept in a predefined relation to this power level.

Once the frequency-dependent imbalance has been determined, it may be compensated in a subsequent step. Possible compensation approaches may comprise calibration processes or a dynamic adaptation.

According to a further aspect, a computer program product is provided which comprises program code portions for performing the steps of any of the methods and method aspects described herein when the computer program product is executed on one or more computing devices, for example on a mobile telephone or on a network or data card. The computer program product may be stored on a computer-readable recording medium, such as a permanent or re-writable memory within or associated with the computing device, a CD-Rom, DVD, and so on. The computer program product may be also be provided for a download to the computing device, for example via a data network such as the Internet and/or a communication connection such as a wireless link.

According to a still further aspect, an apparatus for determining a frequency-dependent imbalance between different signal branches is provided. The apparatus comprises a generator adapted to provide at least one test signal, wherein the test signal in a time domain representation comprises a sequence of discrete states that gives rise to a plurality of discrete tones in a frequency domain representation of the test signal, an interface adapted to subject the test signal to one or more time domain signal processing operations in each signal branch to obtain a processed test signal from each signal branch, a converter adapted to convert the processed test signals from the signal branches, or an error signal derived therefrom, to the frequency domain to obtain a respective frequency domain representation, and an analyzer adapted to determine the frequency-dependent imbalance from the one or more frequency domain representations.

The apparatus may further comprise a synchronization module. The synchronization module may be adapted to synchronize an injection of the test signal by the generator (via the interface) with operation of the converter.

Also provided is a wireless communication device comprising the at least two signal branches and the apparatus. The device may be operable in at least one of an Orthogonal Frequency Division Multiplexing (OFDM) configuration, a zero-IF configuration and a complex-IF configuration. As an example, the device may comprise a receiver, transmitter or transceiver adapted to operate in an OFDM, zero-IF and/or complex-IF configuration.

According to a still further aspect, a test signal for determining a frequency-dependent or any other (e.g., frequency-independent) property of a signal path is provided. The test signal comprises in a time domain representation a sequence of discrete states that gives rise to a plurality of discrete tones in a frequency domain representation of the test signal. The sequence may be any multi-level sequence such as a binary sequence. Moreover, the test signal, or a set of two or more different test signals, may additionally comprise or give rise to a zero frequency component in a frequency domain representation thereof.

In the test signal, each state change may occur on an equidistant time grid. The time grid may be synchronized with frequency domain conversion (by, e.g., an FFT). In one implementation, the sequence of discrete states is periodically repeated in the test signal. In such a manner, the frequency distance between the discrete tones can be controlled via the sequence length (for a given clock frequency).

The test signal may be used to measure any frequency-dependent parameter of the signal path, wherein the signal path may comprise one, two or more signal branches. As an example, the test signal may be used to measure the transfer function of the signal path. Alternatively, the test signal may used for determining a frequency-dependent imbalance (e.g., an IQ imbalance) between different signal branches.

BRIEF DESCRIPTION OF THE DRAWINGS

In the following, the present disclosure will be described in more detail with reference to exemplary embodiments illustrated in the drawings, in which.

DETAILED DESCRIPTION

In the following description, for purposes of explanation and not limitation, specific details are set forth to provide a thorough understanding of the present disclosure. It will be apparent to one skilled in the art that the technique disclosed herein may be practiced in other embodiments that depart from these specific details. For example, while the following embodiments will primarily be described in relation to OFDM receivers, the skilled artisan will appreciate that the present disclosure is not limited to such an implementation. Moreover, while the embodiments focus on a receiver implementation of the technique presented herein, it will be apparent that the technique can also be implemented in a transmitter or in any analog signal processing chain that is followed by a frequency domain conversion.

Those skilled in the art will further appreciate that the functions explained herein may be implemented using individual hardware circuitry, using software functioning in conjunction with a programmed microprocessor or general purpose computer, using an Application Specific Integrated Circuit (ASIC) or using one or more Digital Signal Processors (DSPs). It will also be appreciated that the technique described herein could be embodied in a processor and a memory coupled to the processor, wherein the memory is encoded with one or more programs that perform the methods and method aspects disclosed herein when executed by the processor.

Figure 1:
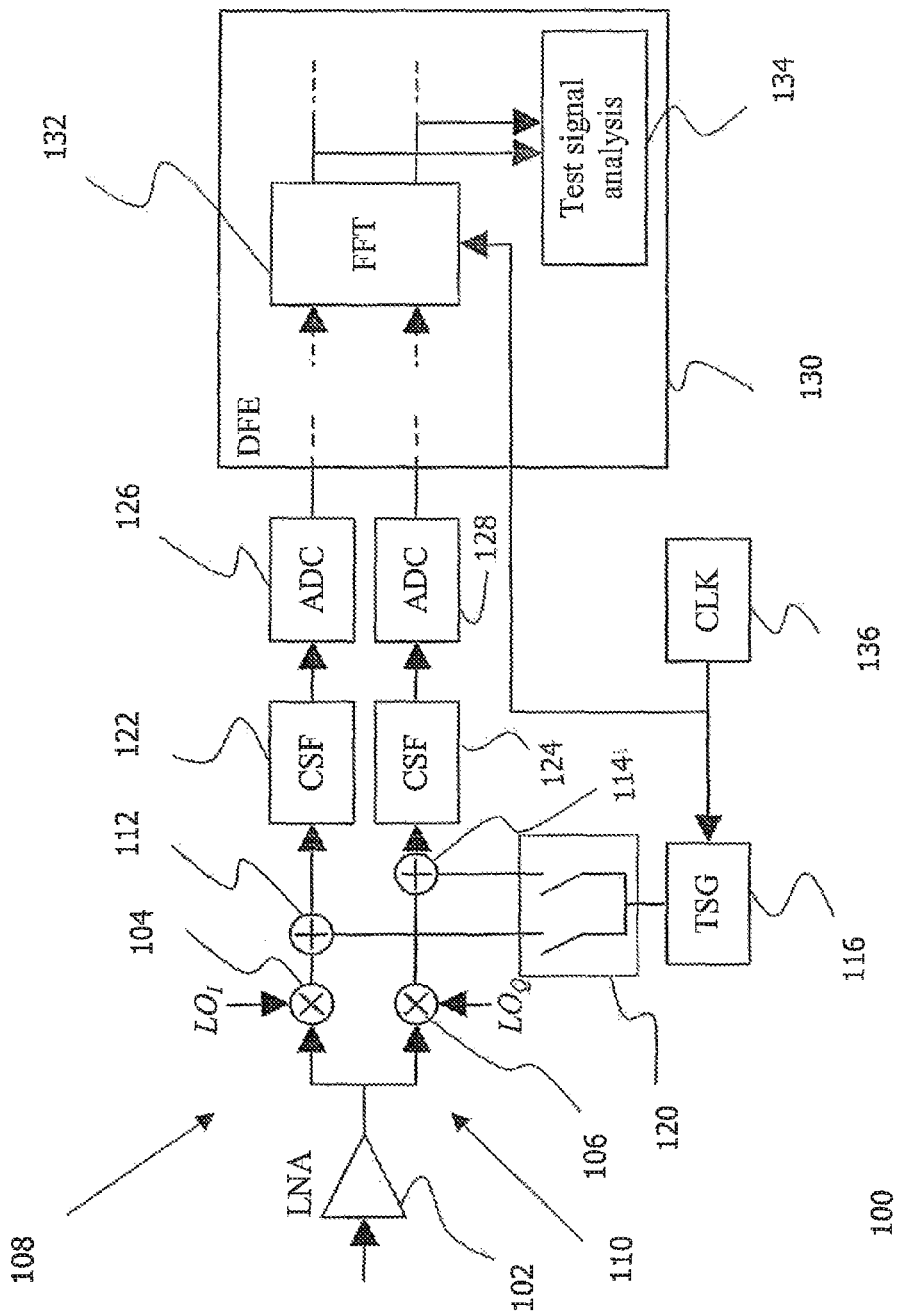
FIG. 1 illustrates a first receiver embodiment comprising components for determining a frequency-dependent imbalance between different signal branches of a receiver.

FIG. 1 illustrates an embodiment of a zero-IF receiver 100 comprising hardware and/or software components for determining a frequency-dependent imbalance between different signal branches of the receiver 100. The receiver 100 may be integrated together with a transmitter into a single transceiver platform. The transceiver platform may be installed in any communication device such as a mobile telephone, notebook computer, data or network card, base station and so on.

In the following embodiments it will be assumed that the receiver 100 conforms to the 3GPP Long Term Evolution (LTE) standard according to 3GPP Release 8 or higher. This implies that the receiver 100 supports OFDM operation. It will be appreciated that the technique presented herein is not limited to receivers conforming to the 3GPP LTE standard.

As shown in FIG. 1, the receiver 100 comprises multiple components including a Low-Noise Amplifier (LNA) 102. The LNA 102 is configured to amplify an RF signal received via one or multiple antennas (not shown in FIG. 1). The signal amplified by LNA 102 is input in parallel to two mixers 104, 106 arranged in different signal branches 108, 110 of the receiver 100. Mixer 104 is configured to mix the amplified signal with a local oscillator signal $LO_I$, and the associated signal branch 108 thus processes the I signal component. Mixer 106, on the other hand, is configured to mix the amplified signal with a local oscillator signal $LO_Q$. The associated signal branch 110 therefore processes the Q signal component. The two local oscillator signals $LO_I$ and $LO_Q$ are separated in phase by 90°.

Downstream of each mixer 104, 106, an adder 112, 114 is provided in each signal branch 108, 110. The adders 112, 114 can be interpreted to constitute interfaces for injecting a test signal in each of the signal branches 108, 110. The test signal is generated by a test signal generator 116 and can selectively be applied, via a switch 120, to the adders 112, 114.

Downstream of each adder 112, 114, each signal branch 108, 110 comprises one or more components for time domain processing operations. In the exemplary scenario illustrated in FIG. 1, these components comprise a filter 122, 124 in each signal branch 108, 110 for Channel Select Filtering (CSF). Each filter 122, 124 is followed by an Analog-to-Digital Converter (ADC) 126, 128, after which the digitized signals reach a Digital Front-End (DFE) 130 of the receiver 100.

The DFE 130 comprises an FFT or equivalent block 132 to convert the processed signals from the signal branches 108, 110 from the time domain to the frequency domain to obtain respective frequency domain representations thereof. A test signal analyser 134 is coupled to the outputs of the FFT block 132. In FIG. 1 and the following figures dual inputs and outputs of blocks such as FFT block 132 and analyzer 134 indicate the input and output of complex quantities.

The analyzer 134 is configured to determine a frequency-dependent imbalance between the different signal branches 108, 110, or any other frequency-dependent receiver parameter, based on the output signals of the FFT block 132. The receiver 100 may further comprise a compensation module (not shown in FIG. 1) configured to compensate the frequency-dependent imbalance, or any other frequency-dependent receiver parameter, based on the result of the analysis performed by test signal analyser 134. Alternatively, the frequency-dependent imbalance may be removed during receiver calibration (e.g., during the manufacturing process). It is also possible to store parameters indicative of the frequency-dependent imbalance and to retrieve the parameters for compensating subsequent receptions.

The specific sequence underlying the currently injected test signal as well as the resulting power distribution of the discrete tones are assumed to be known to the analyser 134 for a reliable determination of the IQ imbalance. To this end, the test signal generator 116 may communicate information regarding the currently injected test signal to the test signal analyser 134.

The FFT block 132 and the test signal generator 116 are in one implementation run synchronously to enable an accurate detection of the discrete spectral components (i.e., tones) of the processed test signal by the FFT block 132. To this end, a synchronization module 136 is coupled to both the test signal generator 116 and the FFT block 132 to provide a common clocking signal to both components. The synchronization may be performed such that the spectral components of the test signal output by the test signal generator 116 spectrally align with the FFT frequency points (or FFT bins).

It should be noted that for brevity reasons, not all analog and digital components typically found in a receiver are shown in FIG. 1. As non-limiting example, no Variable Gain Amplifier (VGA) is shown in the analog signal processing stage of the receiver 100. Also, certain components of the DFE 130, such as filtering, decimation, resampling and frequency error correction components, have been omitted.

Figure 2:
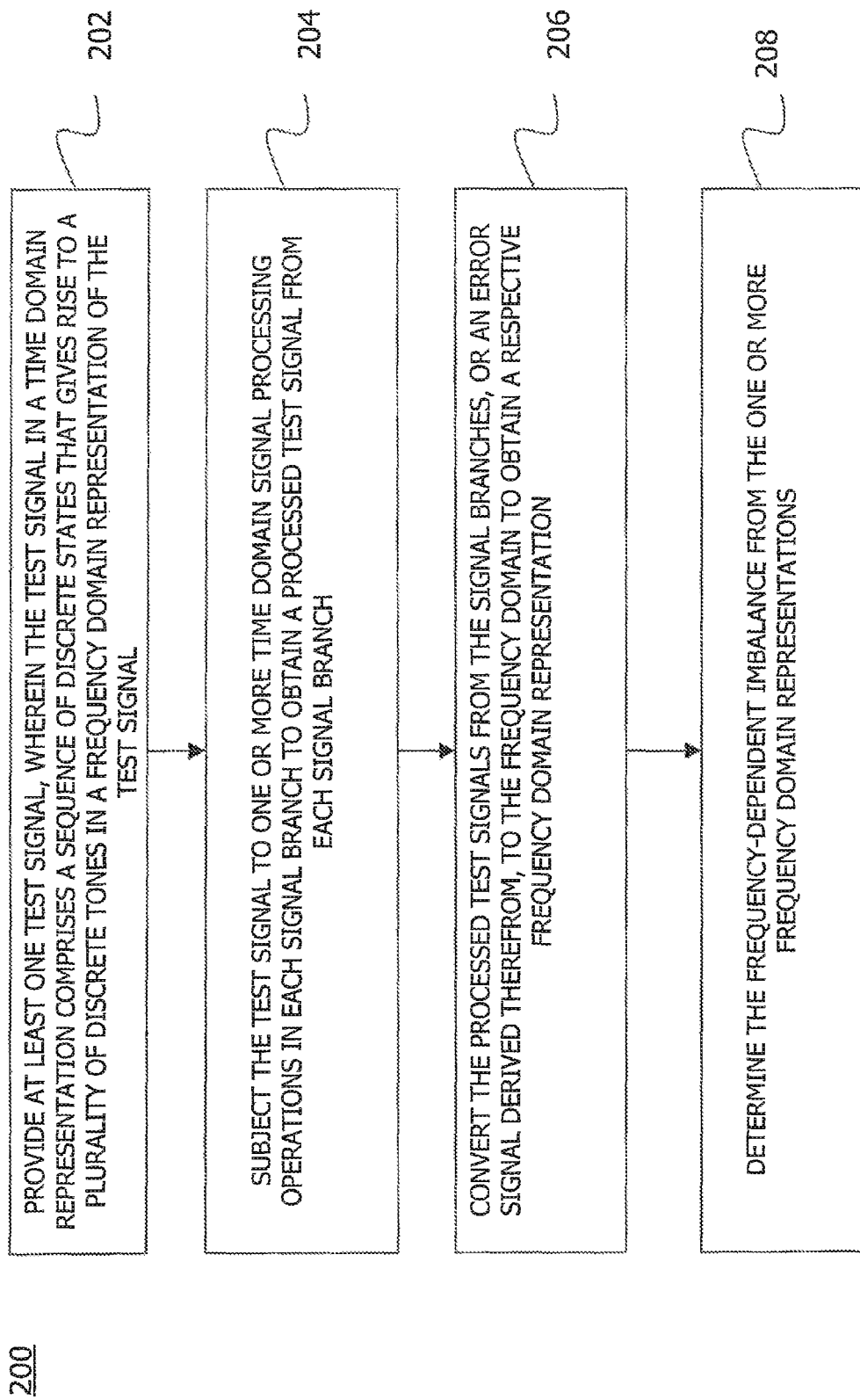
FIG. 2 shows a flow diagram illustrating a method embodiment based on the operation of the apparatus of FIG. 1.

In the following, the operation of the receiver 100 with respect to test signal generation and test signal processing will be described with reference to the exemplary flow diagram of FIG. 2. FIG. 2 illustrates a method embodiment for determining a frequency-dependent imbalance between the two signal branches 108, 110. It should be noted that this method embodiment could also be performed by a receiver having a configuration different from the configuration of the receiver 100 of FIG. 1.

The operation of the receiver 100 with respect to the determination of a frequency-dependent imbalance between the signal branches 108, 110 starts in step 202 with the provision of one or multiple test signals by the test signal generator 116.

The test signal generator 116 generates the test signals such that each test signal, in a time domain representation, comprises a sequence of discrete states that may optionally be periodically repeated in the test signal per FFT frame. In a frequency domain representation, this yields a plurality of discrete tones.

The tones of each test signal cover a broad spectral range (e.g., at least the bandwidth of a regularly received signal). In practice, due to the specific test signal design, the tones may cover a much broader bandwidth than a regularly received signal. The fact that each test signal covers a broad spectral range enables a fast and accurate detection of a frequency-dependent IQ imbalance. This detection is faci-litated by the FFT in block 132, that enables to determine (e.g., to estimate) the IQ imbalance on a frequency point (frequency bin) or frequency range basis. This approach is generally more efficient than using, for example, a single tone that is stepped in frequency.

In the following, test signal embodiments comprising two-state sequences (i.e., binary sequences) will be considered in more detail. It should be noted, that non-binary sequences such as ternary sequences can be also be used as such sequences can be designed to give rise to a discrete spectrum in a frequency domain representation thereof. It has, however, been observed that generation and injection of the test signal into the signal branches 108, 110 becomes increasingly difficult with an increasing number of discrete states. Specifically, a binary sequence is rather simple to generate and inject at basically any point of the analog signal processing stage of the receiver 100 without introducing significant parasitic loading on sensitive processing components or jeopardizing the dynamic range by introducing non-linear effects or noise.

As has already been mentioned above, generation and injection of the test signal by the test signal generator 116 into the signal branches 108, 110 is synchronized, by synchronization module 136, with the frame timing of the FFT block 132. As a result of this synchronization, the discrete tones of the processed and frequency-converted test signals will coincide with the frequency points of the FFT. In general, the sequence may remain the same from one FFT frame to another, or may vary. Furthermore, a specific sequence may be repeated during one FFT frame to give a sparser spectrum of discrete tones. As a result, the power of each tone (i.e., spectral component) in the FFT output becomes correspondingly higher.

Discrete tones in the frequency domain are obtained when the change of states in the sequence appears on an equidistant time grid (defined, in the present embodiment, by the clock frequency of the synchronization module 136). The spacing between discrete tones in the frequency domain can be controlled by the sequence length (for a given clock frequency). For example, if the sequence length in number of clock cycles is the same as the FFT frame length in number of clock cycles, then there will be a discrete tone in each FFT bin. If the sequence length is reduced to half the FFT frame length (and repeated twice so that the overall duration still corresponds to the FFT frame length), then every second FFT bin will be populated with a discrete tone, and so on.

Figure 3:
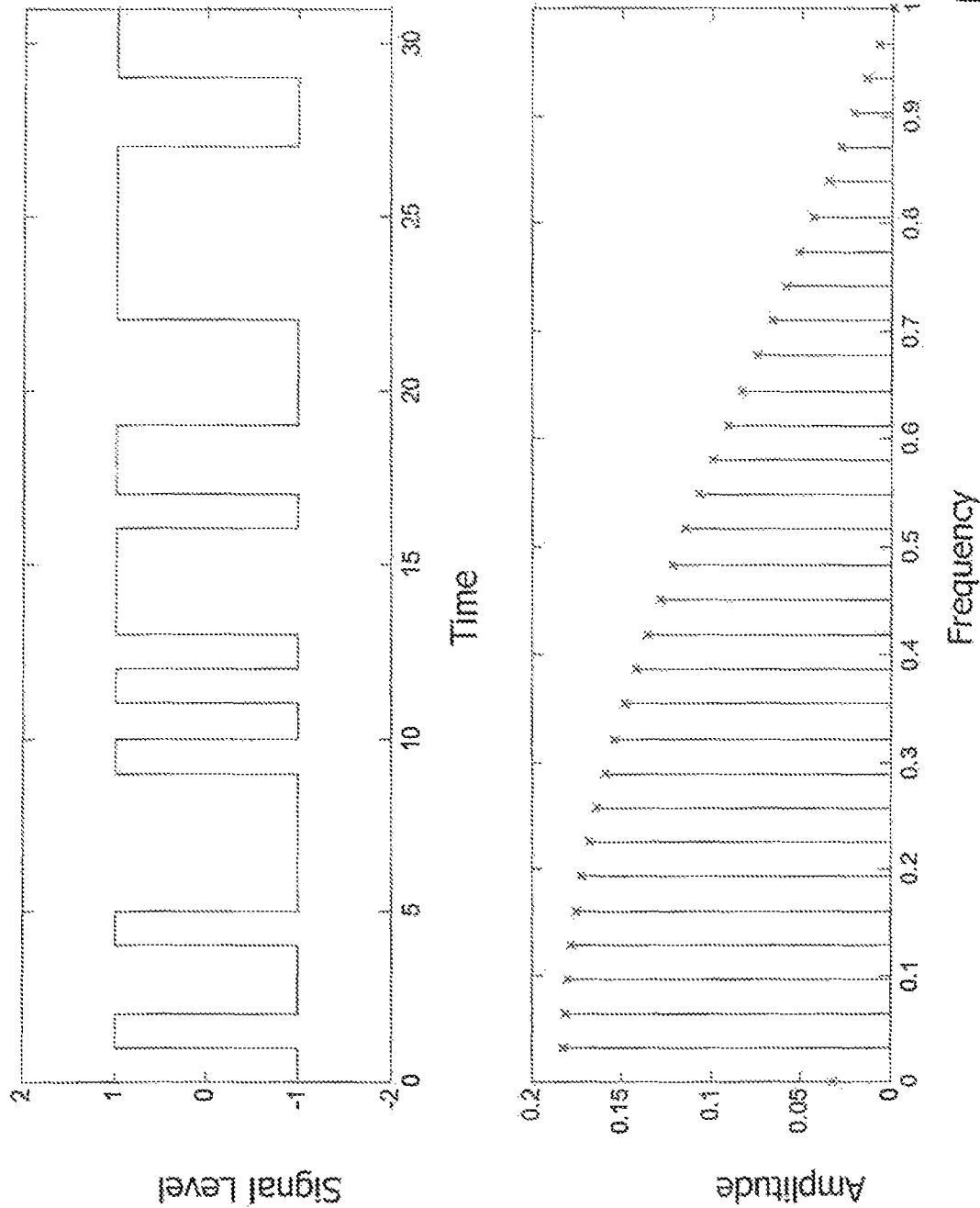
FIG. 3 shows a first test signal embodiment.
Figure 4:
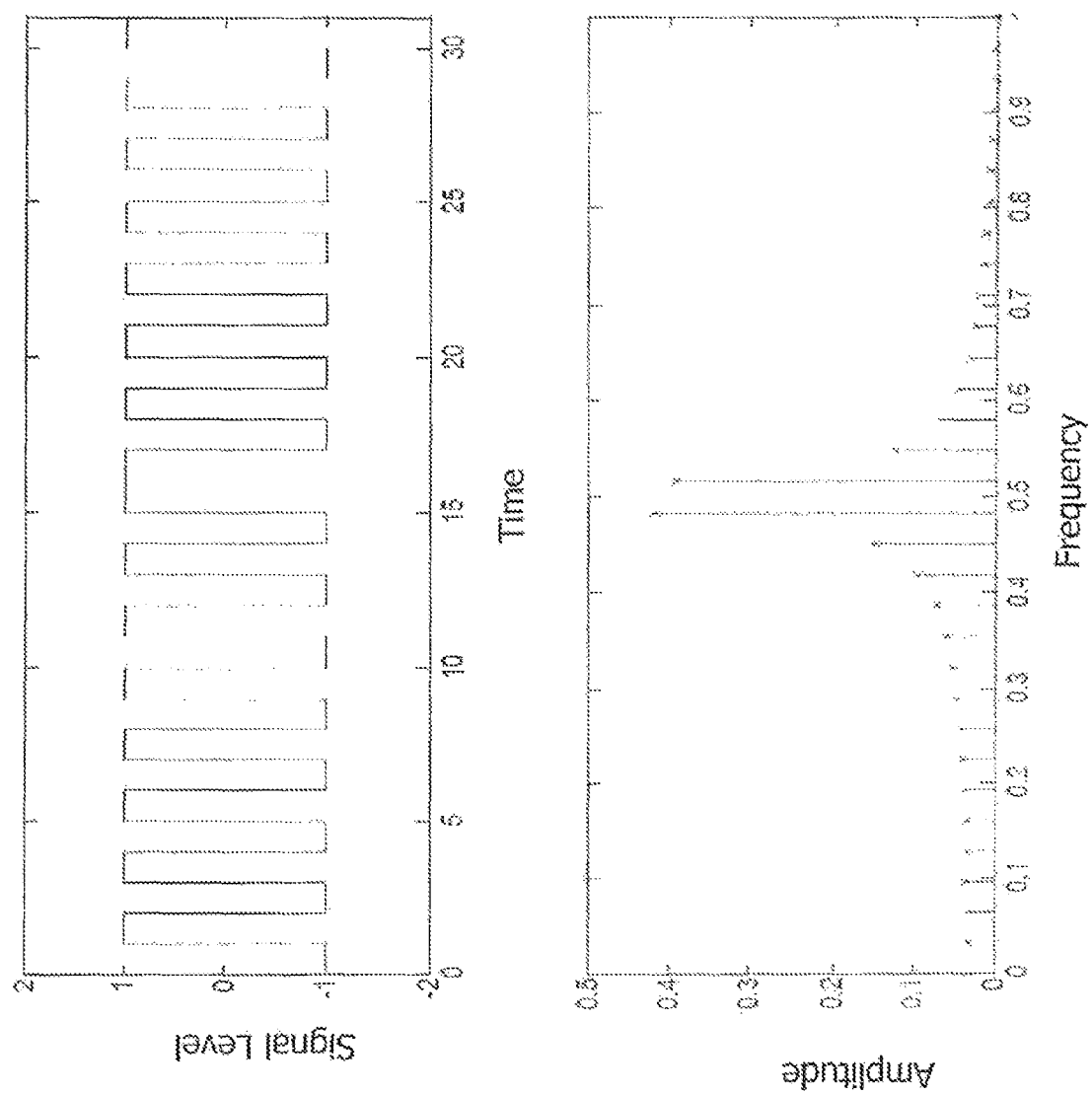
FIG. 4 shows a second test signal embodiment.
Figure 5:
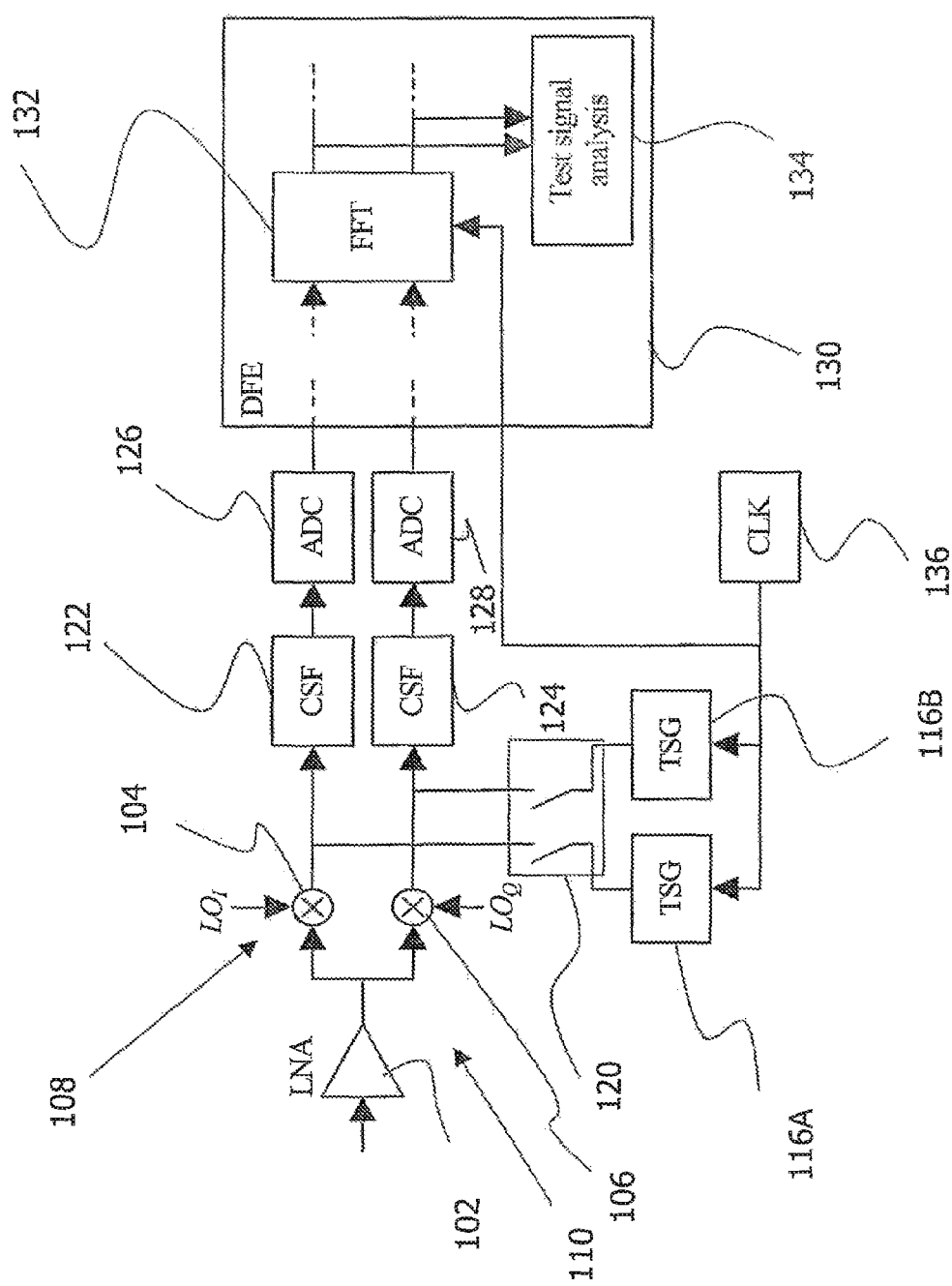
FIGS. 5 to 9 illustrate further receiver embodiments.

Now, two exemplary binary sequences that may be provided by the test signal generator 116 are described in more detail with reference to FIGS. 3 and 4. One choice of binary sequence illustrated in FIG. 3 is constituted by a pseudo-noise sequence generated by a Linear Feedback Shift Register (LFSR) and has a length of 31 clock cycles. A special class of LFSR that can be utilized here is the Maximum Length (ML) LFSR which cycles through all the possible states (except the all-zero states) of the shift register. The spectral properties of an LFSR sequence are such that all discrete spectral components have the same magnitude. However, in the time continuous domain, when the binary sequence is converted by means of hold function, the spectrum of the discrete components is shaped by the well-known sinc response. This spectral shaping is illustrated in the lower portion of FIG. 3 for one ML LFSR sequence based on a 5-register ML LFSR with 31 states (the corresponding time domain representation of the sequence is illustrated in the upper portion of FIG. 3). The frequency scale is normalized with respect to the clock rate of the LFSR as provided by the synchronization module 136. Correspondingly, the time scale is normalized with respect to the clock period.

If the spectral shaping caused by the sinc response is undesired, a higher clock rate for the test signal generator 116 may be used. Alternatively, a different binary sequence could be designed that, to a certain fraction of the spectrum below half the clock rate, could compensate for the sinc response. However, sequences could also be generated by the test signal generator 116 with one or more spectral regions being boosted to provide a higher analysis accuracy of the test signal analyser 134 for the boosted regions. One simple example for such a binary sequence is illustrated in FIG. 4. The upper portion of FIG. 4 again illustrates the binary sequence in a time domain representation, while the lower portion of FIG. 4 shows the same sequence in a frequency domain representation. As becomes apparent from the lower portion of FIG. 4, the particular sequence design boosts a spectral region in the centre of a given frequency band.

In the following, the exemplary test signals of FIGS. 3 and 4 will be described in the LTE context considering the use of the 30.72 MHz maximum FFT sample rate of the LTE standard as clock rate for sequence generation. In this case, an LTE channel of nominally 20 MHz will host a signal having a signal bandwidth of 18 MHz, corresponding to a bandwidth of 9 MHz at baseband. These bandwidth parameters correspond to a normalized bandwidth of 9/30.72=0.29. For this normalized bandwidth, the magnitude droop of the sinc-shaped spectrum in FIG. 3 is only around 1.3 dB.

The length of the FFT frame should equal an integer multiple of the sequence length, so that the discrete tones of the test signal can align with the FFT frequency points. For this reason, the odd length of the ML LFSR sequences will not align with the typical $2^n$ length of FFT frames. To address this fact, the ML LFSR sequence can be extended by one cycle, resulting in some (minor) change in its spectral properties. If, for example, the sequence of FIG. 3 with 31 states is extended by one cycle having a value of −1, the total sequence length becomes 32. The resulting sequence may be repeated 64 times during one FFT frame with a frame length of 2048 (i.e., the maximum FFT frame length for an LTE channel having a bandwidth of 20 MHz).

Returning to FIG. 2, the test signal generator 116 will inject, in step 204, the test signal generated in step 202 to the signal branches 108, 110. As a result, the injected test signal will be subjected to time domain signal processing operations in the CSF 122, 124. According to the receiver embodiment of FIG. 1, the test signal generator 116 injects the same test signals into the signal branches 108, 110.

Once the test signals have been processed (i.e., filtered) by the CSF 122, 124, they are subjected to the ADC 126, 128 of the respective signal branch 108, 110. The resulting digital representations of the filtered test signals are then converted, in step 206, by the FFT block 132 to the frequency domain. Thus, a respective frequency domain representation is obtained for each filtered test signal.

The resulting frequency domain representations are fed to the test signal analyser 134 which determines, in step 208, the frequency dependent IQ imbalance from the received frequency domain representations. Then, if the test signal analyser 134 should detect an IQ imbalance, this imbalance may be compensated for either dynamically or during a one-time calibration process. Compensation can either take place in the analog receiver part or in the DFE 130. Exemplary techniques for determining and compensating a detected IQ imbalance are described in U.S. Pat. No. 7,336,730 B2, by Tarighat et al., "Compensation Schemes and Performance Analysis of IQ Imbalances in OFDM receivers", IEEE Transactions on Signal Processing, Vol. 53, No. 8, August 2005, pages 3257 to 3268, and by Ylamurto, T., "Frequency Domain IQ Imbalance Correction Scheme for Orthogonal Frequency Division Multiplexing (OFDM) Systems", in Wireless Communications and Networking, 2003, ISSN 1525-3511, pages 20 to 25.

In the following, various further receiver embodiments will be discussed with reference to FIGS. 5 to 9. In this regard, the same reference numerals as in FIG. 1 will be used for the same or similar components. As the operation of the following receiver embodiments regarding the generation, injection and analysis of the test signals is largely similar to the operation of the first receiver embodiment described above with reference to FIG. 2, only the most relevant differences will be discussed in more detail hereinafter.

As has been explained above with reference to the receiver embodiment of FIG. 1, a single test signal generated by the test signal generator 116 can be used to drive both signal paths 108, 110. In the second receiver embodiment illustrated in FIG. 5, different test signals are injected into the different signal paths 108, 110. To this end, the test signal generator 116 is split into two generator components 116A, 116B, each generating a dedicated test signal.

The dedicated test signals generated by the two generator components 116A, 116B may, for example, be designed such that the resulting complex-valued test signal constituted by the test signal injected into the I signal branch 108 on the one hand and the test signal injected into the Q signal path on the other has an asymmetric spectrum around DC. Such an asymmetric spectrum may be beneficial as the image caused by the IQ imbalance will be more pronounced where the original spectral content (say at frequency −f) is small, or a have a completely different phase compared to its mirror frequency counterpart (at frequency f). For smaller sequence lengths suitable combinations of different test signals (i.e., different sequences) can be found by an exhaustive search over all possible state combinations.

The test signals injected by the generator components 116A, 116B may also be chosen such that one test signal is a delayed version of the other test signal. In this case the respective sequences may be identical.

Figure 6:
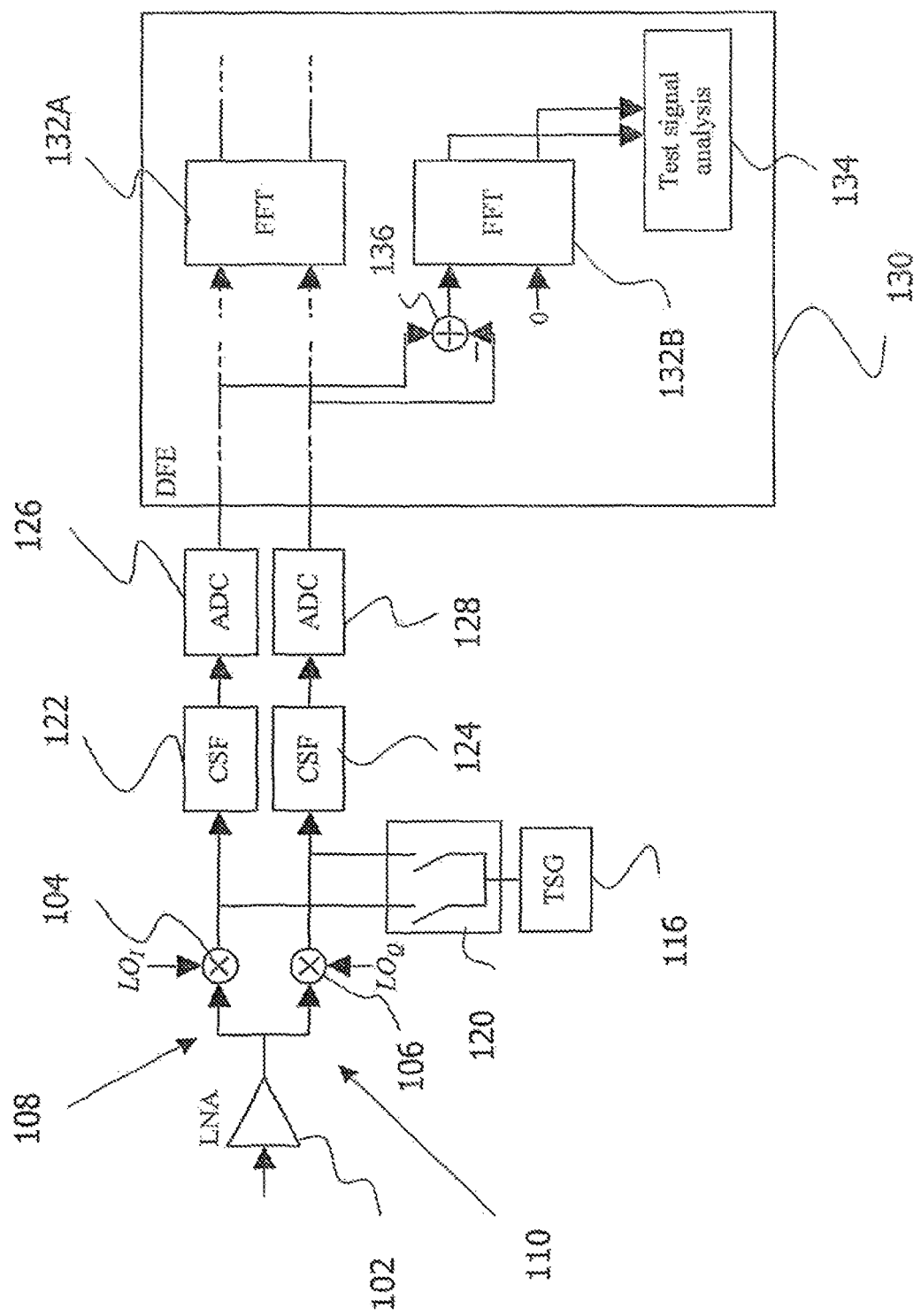

A still further receiver embodiment is illustrated in FIG. 6. In a similar manner as in the receiver embodiment of FIG. 1, a single test signal generator 116 is used to drive the I and Q signal paths 108, 110. However, the DFE 130 is modified in that an error signal is generated as the difference between the processed test signals in the time domain. To this end, an adder 136 is provided which subtracts the test signal processed in the Q signal branch 110 from the test signal processed in I signal branch 108. Ideally, when both signal branches 108, 110 have identical characteristics, the error signal will be zero. Otherwise, a non-zero error signal will be obtained by the adder 136.

In the receiver embodiment illustrated in FIG. 6, in addition to the "conventional" FFT block 132A, a dedicated FFT or equivalent block 132B is provided to process the (real-valued) error signal generated by the adder 136. The frequency domain signal output by the FFT 132B will be processed by the test signal analyser 134 in essentially the same manner as discussed above with reference to FIG. 1.

Figure 7:
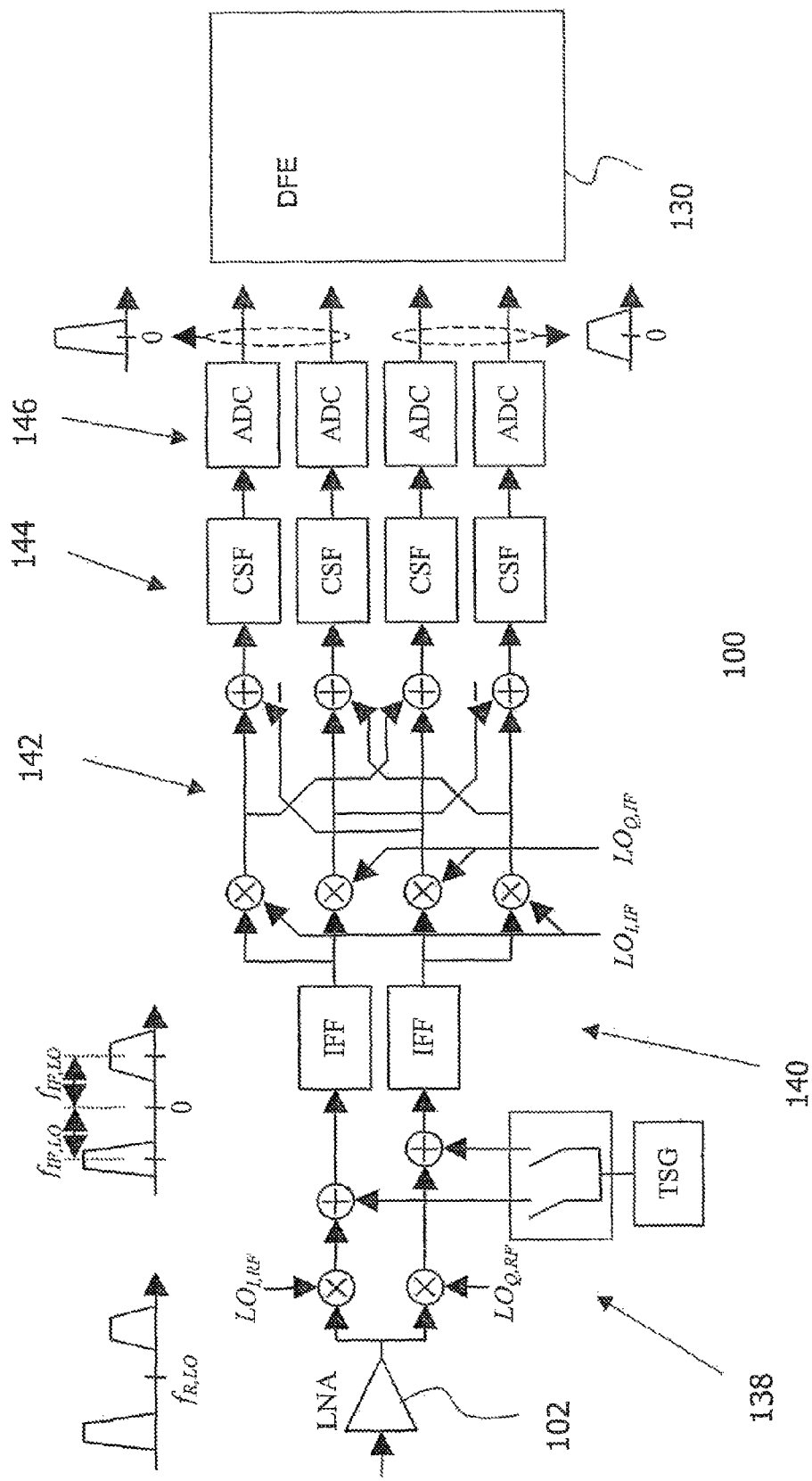

FIG. 7 illustrates a still further receiver embodiment which is no longer based on the principle of direct conversion, but on a complex IF architecture with a two step frequency conversion process that can have more intricate signal path imbalances.

In the receiver embodiment of FIG. 7, the scenario of a dual carrier reception is considered where an initial RF downconversion at an RF mixer stage 138 shifts the signal spectrum such that the centre of the two carriers is at DC. An IF Filter (IFF) stage 140 is used downstream of the RF mixer stage 138 to reduce the dynamic range requirements of a subsequent complex IF mixer stage 142. The IF mixer stage 142 performs a second down-conversion by shifting each carrier individually to DC. The IF mixer stage 142 is followed by a CSF stage 144 as well as an ADC stage 146 in a similar manner as for the zero-IF receiver embodiments of FIGS. 1, 5 and 6.

In the receiver architecture illustrated in FIG. 7, test signals may be injected by the test signal generator 116 directly after RF down-conversion (i.e., after RF mixer stage 138). Alternatively, test signal injection may also occur at alternative injection points, for example after IFF stage 140 or after IF mixer stage 142 (depending on the particular IQ imbalance that is to be estimated). Moreover, as discussed above with reference to FIGS. 5 and 6, different test signals may be injected into the different signal branches 108, 110, and test signal analysis also could be based on an error signal.

In general, the test signal may be injected when there is no reception (i.e., when the RF front-end of the receiver 100 is turned-off) to support self-calibration during manufacturing, upon power-up of the receiver 100 or initiated by any other event during receiver operation. Alternatively, the test signal may also be injected simultaneously with reception (i.e., in a regular reception mode). As will be described in more detail below, in this situation the test signal must have spectral properties that are devised such that it does not significantly interfere with a regularly received signal.

Figure 8:
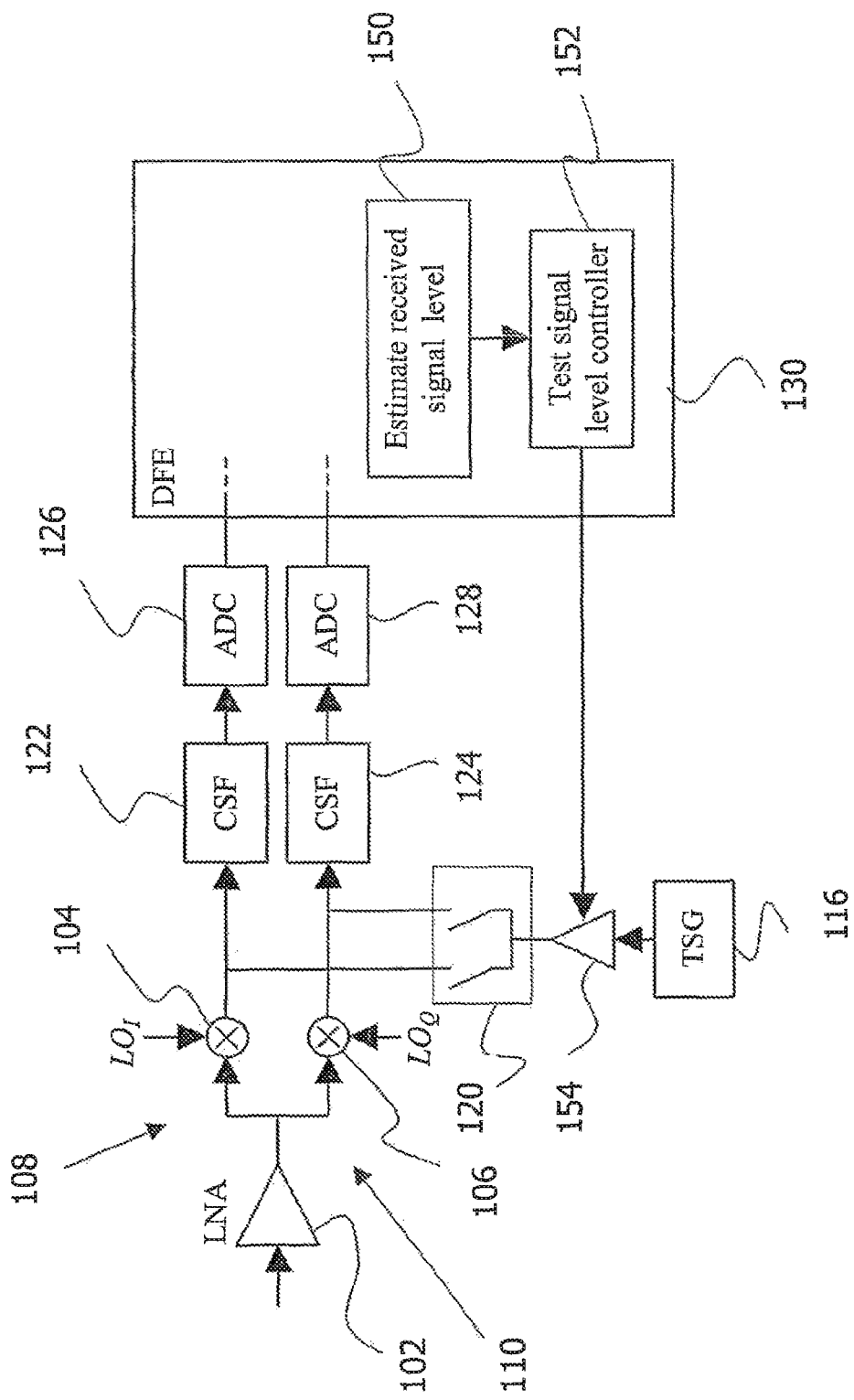

FIG. 8 illustrates a receiver embodiment that permits an overlay operation in which the test signal is injected during a regular reception mode. The overlay operation requires that the injected test signal can either be removed from the regularly received signal prior to detection of the latter signal or that the signal level of the test signal is low compared to the signal level of the regularly received signal.

In scenarios in which the first variant is unfavourable because the test signal cannot be completely removed (e.g., in the presence of an IQ imbalance or any other imbalances), the receiver embodiment illustrated in FIG. 8 allows to keep the power level of the test signal below an estimate power level of the regularly received signal to not significantly reduce the overall reception performance. To this end, the DFE 130 is provided with an estimation module 150 which estimates the power level of the regularly received signal (e.g., on a per-symbol basis). The power level estimate thus obtained is fed to a power level controller 152 for the test signal. The controller 152 drives an amplifier 154 coupled between the test signal generator 116 and the switch 120 such that the power level of the test signal is kept in a predefined relation to the power level of the regularly received signal.

Figure 9:
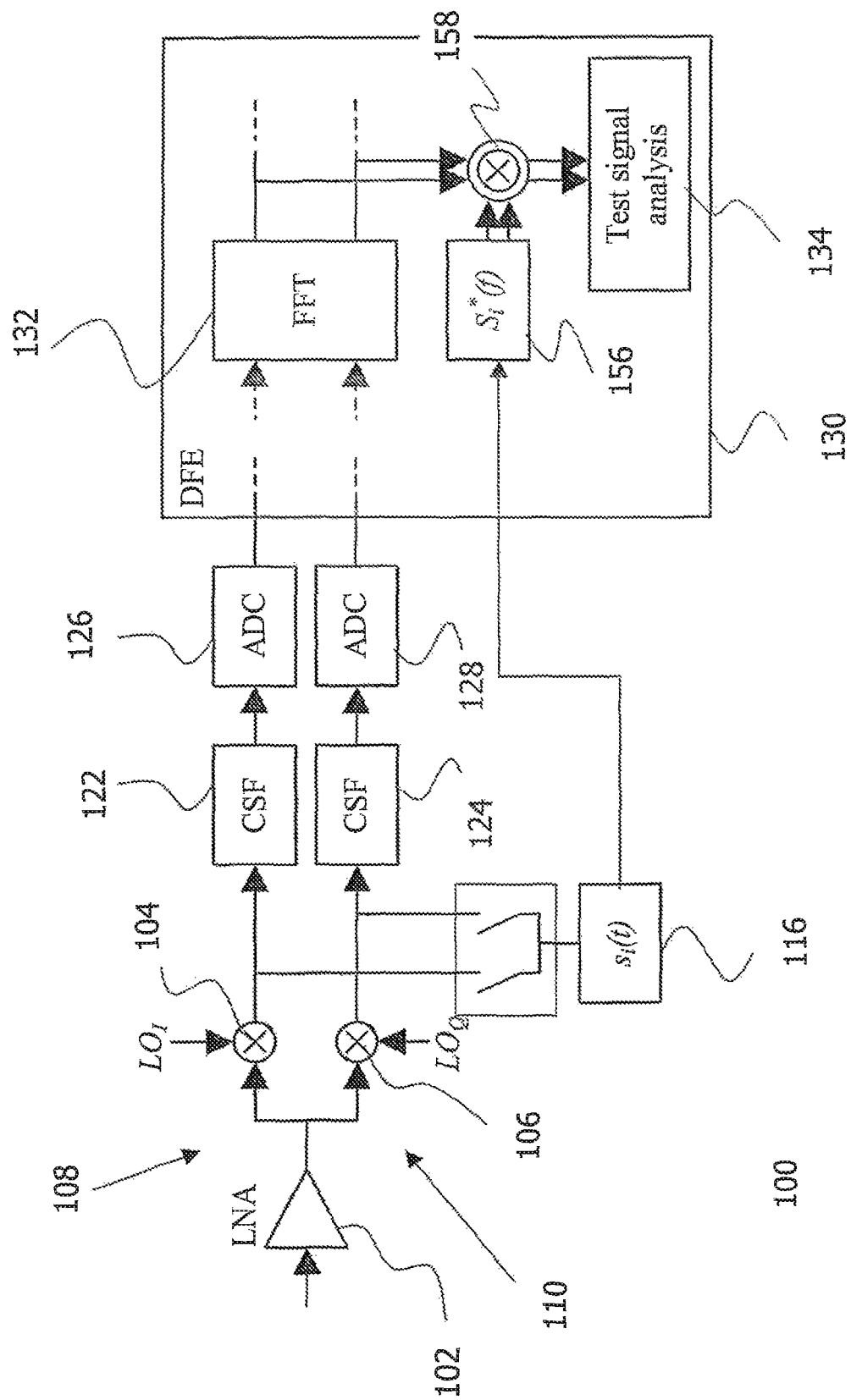

FIG. 9 illustrates a still further receiver embodiment that is based on the receiver embodiment discussed above with reference to FIG. 1. If, for the receiver embodiment of FIG. 1, the test signal sequence processed during subsequent FFT frames (i.e., subsequent OFDM symbols) during overlay operation remains the same, a series of OFDM symbols output by the FFT block 132 is simply added (either in the time or the frequency domain) for coherent summing of the test signal components, while the regularly received signal—having an assumed random nature—will have an expectation value of zero. This accumulation can be carried out (e.g., by the test signal analyser 134) until sufficient fidelity for the test signal is obtained.

However, the regularly received signal may contain signal parts (e.g., sub-carriers) that are not fully random, such as reference signals, synchronization signals, pilot signals and so on. Such signal parts may coincide with the frequency points utilized by the FFT where the tones of the test signal are expected. In such a case an offset in the test signal accumulation will be obtained, and this offset will impair test signal analysis. To avoid such an offset, the test signal sequence signal may be changed in, for example, an essentially randomized manner using a receiver design as illustrated in FIG. 9.

According to FIG. 9, randomization is implemented by using a different sequence $s_i(t)$ for the test signal from one FFT frame to the subsequent FFT frame. To maintain the coherent summation of the test signals in the frequency domain, the FFT frame i is first multiplied by the conjugate of the frequency domain representation (bin-by-bin) of the sequence $S_i*(t)$ used in the particular FFT frame i. In the receiver embodiment of FIG. 9, a conjugator 156 and a multiplier 158 are provided to this end in the DEF 130. As illustrated in FIG. 9, the multiplier 158 is located in the signal path between the FFT block 132 and the test signal analyser 134. The conjugator 156 is coupled to the test signal generator 116 to receive information about the currently utilized sequence $s_i(t)$. The length of a sequence used repetitively during one FFT frame may only be a few tens of clock cycles long (as exemplified above). It is therefore feasible to calculate the frequency domain representation of the sequence in real-time or to store the frequency domain representation (precalculated) in a table for this purpose.

With the approach illustrated in FIG. 9, any static component of the regularly received signal will effectively be spread, while the test signal components will add in phase from different FFT frames. Alternatively, to avoid a static component, the whole sequence for one OFDM symbol can be cyclically multiplied by a zero mean sequence (e.g., {+1; −1}), and the signal after FFT block 132 may again be multiplied by the conjugate of the sequence. It should be noted that the actual FFT frequency points (i.e., FFT bins) to process for this purpose are only those that contain test signal components (i.e., tones).

As has become apparent from the above description of exemplary embodiments, the technique presented herein enables a fast and accurate estimation of frequency-dependent signal path imbalances and other receiver properties by use of a wideband but frequency-discrete test signal. The test signal can be based on a simple binary sequence that is easy to generate on the one hand and provides accurate properties (compared to a single tone) on the other. Binary sequences are simple to inject without introducing significant amounts of parasitic components, distortion or noise. However, the sequences comprising more than two levels could be used as well.

The sequences may be designed to have a desired power distribution over the set of discrete tones (e.g., PN sequences). In such an implementation, measurement accuracy can be provided at a spectral portion where it is most needed.

Generally, the same or different test signals may be injected into the same or different receiver components. Additionally, the injected sequences may change from one FFT frame to another. Changing sequences may be used in particular during overlay operation, but also when there is no reception.

While the technique presented herein has been described in relation to its preferred embodiments, it is to be understood that this description is for illustrative purposes only. Accordingly, it is intended that the invention be limited only by the scope of the claims appended hereto.

The invention claimed is:

1. A method of determining a frequency-dependent imbalance between different signal branches, the method comprising:
    providing at least one test signal, wherein the test signal in a time domain representation comprises a sequence of discrete signal levels that gives rise to a plurality of discrete tones in a frequency domain representation of the test signal;
    subjecting the test signal to one or more time domain signal processing operations in each signal branch to obtain a processed test signal from each signal branch;
    converting the processed test signals from the signal branches, or an error signal derived therefrom, to the frequency domain to obtain a respective frequency domain representation; and
    determining the frequency-dependent imbalance from the one or more frequency domain representations,
    wherein the conversion to the frequency domain maps each of the processed test signals, or the error signal derived therefrom, to a number of predefined frequency points, and wherein the plurality of discrete tones in the frequency domain representation of the test signal coincides with the predefined frequency points.

2. The method of claim 1, wherein said sequence of discrete signal levels is a binary sequence of discrete signal levels.

3. The method of claim 1, wherein the frequency-dependent imbalance is determined on a frequency point basis, and wherein an interpolation technique is used to determine the frequency-dependent imbalance for frequency points located between two neighboring tones.

4. The method of claim 1, wherein the number of predefined frequency points defines a frequency conversion frame length, and wherein the sequence of discrete signal levels has a sequence length that is selected so that an integer multiple of the sequence length equals the frequency conversion frame length.

5. The method of claim 1, further comprising dynamically changing the sequence of discrete signal levels.

6. The method of claim 1, further comprising synchronizing an injection of the test signal in the signal branches with the frequency domain conversion of the processed test signals.

7. The method of claim 1, wherein the test signal is generated using a linear feedback shift register.

8. The method of claim 1, wherein different test signals are provided for the different signal branches.

9. The method of claim 1, wherein a first signal branch is provided for processing an in-phase signal component and a second signal branch is provided for processing a quadrature phase signal component.

10. The method of claim 9, wherein different test signals are provided for the different signal branches and wherein the different test signals are chosen such that a non-symmetric spectrum around zero frequency is obtained for the in-phase and quadrature phase signal components corresponding to the different test signals.

11. The method of claim 1, wherein the method is performed concurrently with signal reception or signal transmission in a regular reception mode or a regular transmission mode.

12. The method of claim 11, further comprising determining a power level of a received signal or a signal to be transmitted, wherein a power level of the test signal is kept in relation to the power level thus determined.

13. An apparatus for determining a frequency-dependent imbalance between different signal branches, the apparatus comprising:
  a generator adapted to provide at least one test signal, wherein the test signal in a time domain representation comprises a sequence of discrete signal levels that gives rise to a plurality of discrete tones in a frequency domain representation of the test signal;
  an interface adapted to subject the test signal to one or more time domain signal processing operations in each signal branch to obtain a processed test signal from each signal branch;
  a converter adapted to convert the processed test signals from the signal branches, or an error signal derived therefrom, to the frequency domain to obtain a respective frequency domain representation; and
  an analyzer adapted to determine the frequency-dependent imbalance from the one or more frequency domain representations;
wherein the conversion to the frequency domain maps each of the processed test signals, or the error signal derived therefrom, to a number of predefined frequency points, and wherein the plurality of discrete tones in the frequency domain representation of the test signal coincides with the predefined frequency points.

14. The apparatus of claim 13, wherein said sequence of discrete signal levels is a binary sequence of discrete signal levels.

15. The apparatus of claim 13, further comprising a synchronization module adapted to synchronize an injection of the test signal by the generator with operation of the converter.

16. A wireless communication device comprising the at least two signal branches and the apparatus of claim 13.

17. The device of claim 16, wherein the device is operable in at least one of an Orthogonal Frequency Division Multiplexing (OFDM) configuration, a zero-Intermediate Frequency (zero-IF) configuration, and a complex-IF configuration.

* * * * *